UNITED STATES PATENT OFFICE.

GEORGE P. DELISSER, OF BROOKLYN, ASSIGNOR OF TWO-THIRDS HIS RIGHT TO ADAMS & SHALER, OF NEW YORK, N. Y.

IMPROVEMENT IN MEDICAL COMPOUNDS.

Specification forming part of Letters Patent No. 202,246, dated April 9, 1878; application filed August 21, 1877.

*To all whom it may concern:*

Be it known that I, GEORGE PHILLIPS DE-LISSER, of the city of Brooklyn, in Kings county, and State of New York, have invented a certain new and Improved Compound and process of preparing the same, of which the following is a description:

My invention consists of a compound formed of hemlock-bark, black-oak bark, charcoal, (preferably willow-charcoal,) glycerine, and carbolic acid. It is useful as a curative, is of a sirupy consistency, and is of a reddish color, has a pleasant saccharine odor, is powerfully astringent, is a deodorizer, and possesses valuable antiseptic properties.

As the quality of the compound depends largely on the process by which it is prepared, my invention also consists in a process of preparing it, whereby a good quality is insured.

In carrying out this process I use an extract of hemlock, prepared in any suitable manner, as, for instance, by adding to hemlock-bark sufficient water to cover it, with a quantity of molasses, if desirable, and evaporating by heat until a liquid of sirupy consistency is formed. I also use an extract of black-oak bark, which may be formed in a manner similar to that pursued with the hemlock, or in any other suitable manner. In addition to these extracts I use a charcoal-paste, preferably made from willow-charcoal, which may be produced in any suitable manner—for instance, by pulverizing the charcoal and adding to about fifty (50) pounds of it about one hundred (100) pounds of water, and evaporating by heat until the mass is reduced to a paste-like consistency. To this amount of paste, preferably before it is allowed to cool, I add about two hundred (200) pounds of extract of hemlock, and I also add, preferably about the same time, fifty (50) pounds of extract of oak. Then all are to be thoroughly stirred and mixed until all parts commingle and become perfectly incorporated in one mass. This done, I add one hundred (100) pounds of pure glycerine, preferably while the mass is still warm. The mass is afterward deposited in any suitable receptacle, such as an open trough, and allowed to cool. After it has sufficiently cooled I add about fifty (50) pounds of a solution of carbolic acid, formed by taking about ten (10) pounds of pure crystals, and adding about ninety (90) pounds of water thereto. All are now thoroughly mixed and put into a suitable receptacle or boiler, and heated in any convenient manner, as by steam or hot water circulated through a jacket outside, until the mass attains a temperature of 160° Fahrenheit, whereupon the mass is preferably deposited in a cask, which is subsequently closed tightly. After the lapse of sufficient time to admit of the thorough commingling of all the ingredients, so that they become perfectly incorporated with each other, the compound is drawn off into bottles or other suitable receptacles.

An important result of the process just described is due to the mixing of the extract of hemlock and oak, the charcoal, and glycerine, and allowing them to remain till thoroughly incorporated before introducing the carbolic acid, for in this way the tannin in the hemlock and oak is taken up by the charcoal and glycerine, so that the carbolic acid cannot act on it directly, and hence will not render the compound lumpy, as it otherwise would be apt to do.

This compound, suitably diluted, is useful as an application to cuts, gangrenous sores and ulcers, burns, scalds, wounds, and eruptions of the skin, and for erysipelas, nettle-rash, salt-rheum, for ulcerated sore throat, for piles and gleet, and for inflammation of any muscle, joint, or limb.

What I claim as my invention, and desire to secure by Letters Patent, is—

1. The new and improved compound, consisting of hemlock-bark, black-oak bark, charcoal, (preferably willow-charcoal,) glycerine, and carbolic acid, in about the proportions hereinabove named.

2. The hereinbefore-described process of producing the said new and improved compound by mixing, in about the proportions above named, the extracts of hemlock and oak bark with the charcoal-paste while the latter is warm, then adding pure glycerine, and subsequently allowing the mass to cool, afterward adding the carbolic acid, heating the mass, and finally depositing the mass in a tightly-closed vessel, where it is allowed to remain until all parts have become thoroughly commingled and incorporated, substantially as specified.

GEO. P. DELISSER.

Witnesses:
PATRICK SALLWAY,
EDWARD KELLOGG.